United States Patent
Jhon et al.

(10) Patent No.: US 10,804,674 B2
(45) Date of Patent: Oct. 13, 2020

(54) SATURABLE-ABSORBER-BASED LASER SYSTEM

(71) Applicant: KOREA INSTITUTE OF SCIENCE AND TECHNOLOGY, Seoul (KR)

(72) Inventors: Young Min Jhon, Seoul (KR); Young In Jhon, Seoul (KR); Byunghyuck Moon, Seoul (KR); Minah Seo, Seoul (KR); Taikjin Lee, Seoul (KR); Jae Hun Kim, Seoul (KR); Young Tae Byun, Seoul (KR); Seok Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 266 days.

(21) Appl. No.: 15/726,486

(22) Filed: Oct. 6, 2017

(65) Prior Publication Data
US 2018/0102624 A1 Apr. 12, 2018

(30) Foreign Application Priority Data

Oct. 6, 2016 (KR) ........................ 10-2016-0128951
Sep. 19, 2017 (KR) ........................ 10-2017-0120464

(51) Int. Cl.
| | |
|---|---|
| *H01S 3/11* | (2006.01) |
| *H01S 3/067* | (2006.01) |
| *H01S 3/0941* | (2006.01) |
| *H01S 3/094* | (2006.01) |
| *C01B 32/921* | (2017.01) |
| *C09K 11/67* | (2006.01) |
| *C09K 11/02* | (2006.01) |
| *C01C 3/08* | (2006.01) |
| *B82Y 20/00* | (2011.01) |
| *H01S 3/16* | (2006.01) |
| *B82Y 30/00* | (2011.01) |

(52) U.S. Cl.
CPC .......... *H01S 3/1115* (2013.01); *C01B 32/921* (2017.08); *C01C 3/08* (2013.01); *C09K 11/025* (2013.01); *C09K 11/67* (2013.01); *H01S 3/067* (2013.01); *H01S 3/06791* (2013.01); *H01S 3/0941* (2013.01); *H01S 3/094003* (2013.01); *H01S 3/11* (2013.01); *H01S 3/1118* (2013.01); *B82Y 20/00* (2013.01); *B82Y 30/00* (2013.01); *H01S 3/06712* (2013.01); *H01S 3/09415* (2013.01); *H01S 3/1608* (2013.01); *Y10S 977/755* (2013.01); *Y10S 977/814* (2013.01); *Y10S 977/825* (2013.01); *Y10S 977/951* (2013.01)

(58) Field of Classification Search
CPC combination set(s) only.
See application file for complete search history.

(56) References Cited

FOREIGN PATENT DOCUMENTS

| KR | 1020160150539 A | 12/2016 |
|---|---|---|
| TW | 201403807 A | 1/2014 |

OTHER PUBLICATIONS

Two-Dimensional Nanocyrstal Produced by Exfoliation of Ti3AlC2, Naguib et al. Adv. Mater. 2011, 23, 4248-4253.*
Two-Dimensional Transision Metal Carbides, Naguib et al. ACSNANO. 2012, vol. 6, No. 2, p. 1322-1331.*
Jhon, et al.,"Metallic MXene Saturable Absorber for Femtosecond Mode-Locked Lasers", Advanced Materials, 2017, 1702496 pp. 1-8.
Babak Anasori et al., "2D metal carbides and nitrides (MXenes) for energy storage", Nature Reviews, Article No. 16098, Jan. 17, 2017, vol. 2, pp. 1-17, Macmillan Publishers Limited.

* cited by examiner

*Primary Examiner* — Monique R Peets
(74) *Attorney, Agent, or Firm* — Cantor Colburn LLP

(57) ABSTRACT

Provided are a saturable absorber including at least one material selected from a group of MXenes, and a Q-switching and mode-locked pulsed laser system using the same.

11 Claims, 8 Drawing Sheets
(8 of 8 Drawing Sheet(s) Filed in Color)

FIG. 4A
FIG. 4B
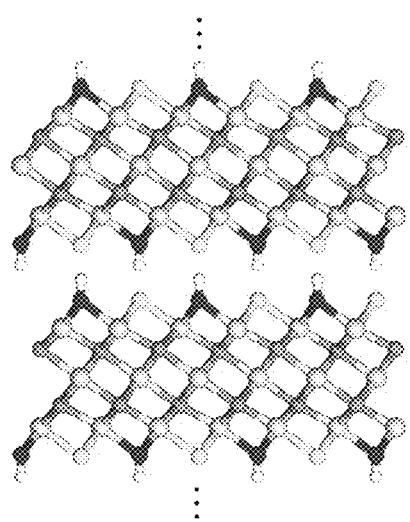
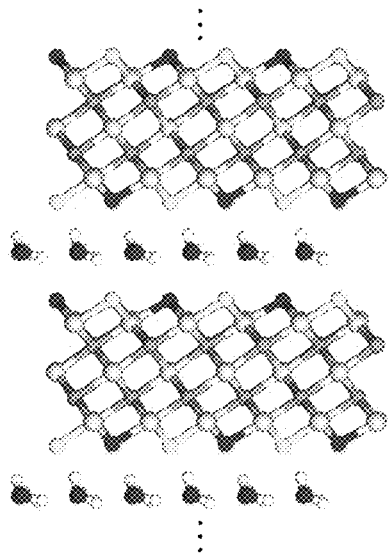
○ Ti ○ F ● O ● N ● C ○ H

SATURABLE-ABSORBER-BASED LASER SYSTEM

CROSS-REFERENCE TO RELATED APPLICATION

This application claims priority to and the benefit of Korean Patent Application No. 10-2016-0128951, filed on Oct. 6, 2016 and Korean Patent Application No. 10-2017-0120464, filed on Sep. 19, 2017, the disclosure of which is incorporated herein by reference in its entirety.

BACKGROUND

1. Field of the Invention

The present invention relates to a saturable absorber and a laser system based on the saturable absorber, and more particularly, to a new saturable absorber using MXene and a Q-switched and/or mode-locked pulsed laser system using the same.

2. Discussion of Related Art

With use of a saturable absorber, which is a passive element, laser mode-locking, Q-switching, etc. can be easily achieved at low costs. In particular, generation of femtosecond laser pulses using the saturable absorber is very important in terms of practical industrial applicability as well as scholarly importance. Thus, much attention has been recently paid thereto and research has been being conducted thereon. Until now, III-IV group semiconductor materials have been mainly used as saturable-absorber materials, but carbon nanotubes, graphene, black phosphorus, gold nanoparticles, two-dimensional (2D) topological insulators, etc. which are new nanomaterial-based saturable absorber materials have been introduced through active research in recent years. Among these materials, a large number of materials cause a mode-locking phenomenon to occur, and only some of them are used to manufacture femtosecond lasers. However, among the materials, black phosphorus is likely to be oxidized upon reacting with moisture in the air, that is, it has low chemical resistance, and gold nanoparticles are expensive. Furthermore, not all materials from which a mode-locked pulsed laser beam may be generated exhibit outstanding performance. Accordingly, there is a need to develop a new saturable-absorber material.

SUMMARY OF THE INVENTION

One aspect of the present invention provides a new saturable-absorber material, and more particularly, a low-cost saturable-absorber material having high chemical stability and saturable absorption performance.

An aspect of the present invention provides a saturable absorber comprising at least one MXene selected from a group of MXenes. In the present disclosure, the group of MXenes includes two-dimensional (2D) transition metal carbides, nitrides, and carbonitrides, and may be expressed as $M_{n+1}X_n$.

Here, M represents a transition metal, X represents C and/or N, and $1 \leq n \leq 3$. The transition metal M may consist of at least one transition metal, and may have various forms, e.g., a form in which each layer is a mixture of two or more transition metals or a form in which a surface layer and an inner layer are formed of different metals. X may contain C and N, e.g., a mixture of C and N. A surface of the MXene may have one or a mixture of chemical functional groups among —O, —OH, and —F. However, a range of MXene is not limited thereto and may include all the ranges of MXene that have been introduced in a paper or an academic society (for instance, see *Nature Review Materials*, 2017, 2, 16098). Examples of such a MXene structure may include $M_4X_3$, $M_3X_2$, $M_2X$, etc.

For example, the saturable absorber may be a stacked MXene structure having a single-layer or multi-layer structure or having a bulk thickness (1 nanometer or greater).

For example, the saturable absorber may be manufactured by drop-casting to achieve a material with a stack structure having a bulk thickness (1 nanometer or greater).

For example, a transition metal of the MXene may include at least one transition metal selected from the group consisting of Sc, Ti, V, Cr, Zr, Nb, Mo, Hf, and Ta or may include two or more types of metals.

For example, only a functional group may be included between layers of the MXene having the multi-layer structure.

For example, a functional group, water, or ions may be included between layers of the MXene having the multi-layer structure.

For example, the MXene may include at least one among $Ti_2C$, $Ti_3C_2$, and $Ti_4C_3$.

For example, the saturable absorber may include $Ti_3CN$.

For example, the group of MXenes may be available to generate a femtosecond pulsed laser beam by mode locking.

For example, the group of MXenes may be available to generate a femtosecond pulsed laser beam by Q-switching.

For example, the group of MXenes may be available for performing mode-locking and Q-switching on a laser beam with a wavelength ranging from near-infrared to far-infrared region (including a mid-infrared wavelength range).

For example, the saturable absorber may be a compound which is a mixture of the group of MXenes and a polymer.

For example, the polymer may include polyvinyl alcohol (PVA) or polyvinyl pyrrolidone (PVP)

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and advantages of the present invention will become more apparent to those of ordinary skill in the art by describing in detail exemplary embodiments thereof with reference to the accompanying drawings, in which:

FIG. 4A is a diagram illustrating a case in which there are only chemical groups between layers during stacking of a MXene (direct hydrogen bonds between layers);

FIG. 4B is a diagram illustrating a case in which there are chemical groups and water molecules between layers during stacking of a MXene (indirect hydrogen bonds between layers);

DETAILED DESCRIPTION OF EXEMPLARY EMBODIMENTS

Hereinafter, technical features of the present invention will be described in detail with reference to the accompanying drawings so that those of ordinary skill in the art can easily understand the invention. The terms or expressions used in the present specification and the claims should not be construed as being limited to as generally understood or as defined in commonly used dictionaries, and should be understood according to the technical idea of the invention, based on the principle that the inventor(s) of the application can appropriately define the terms or expressions to optimally explain the invention. Thus, the embodiments set forth in the present specification and drawings are just exemplary embodiments of the present invention and do not completely represent the technical idea of the present invention. Accordingly, it would be obvious to those of ordinary skill in the art that the above exemplary embodiments are to cover all modifications, equivalents, and alternatives falling within the scope of the invention at the filing date of the present application.

A saturable-absorber material according to an embodiment of the present invention includes at least one selected from a group of MXenes.

Figure 1:
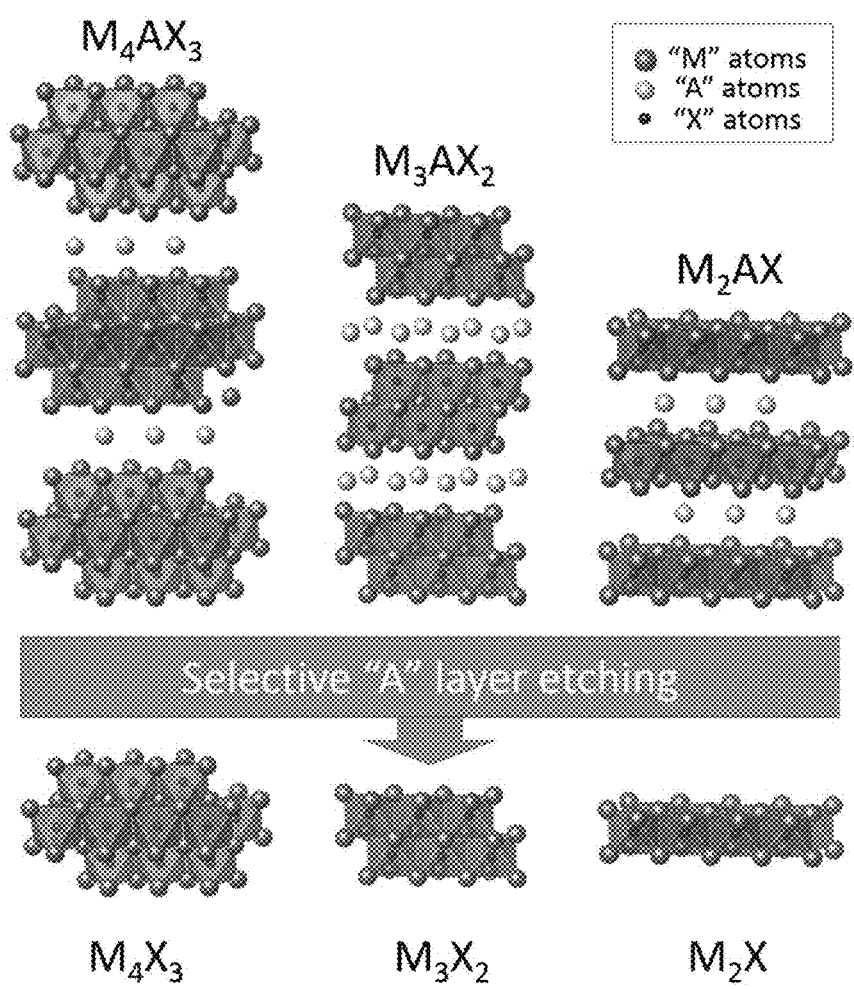
FIG. 1 is a diagram schematically illustrating a method of forming a MXene applicable to an embodiment of the present invention.
Figure 2:
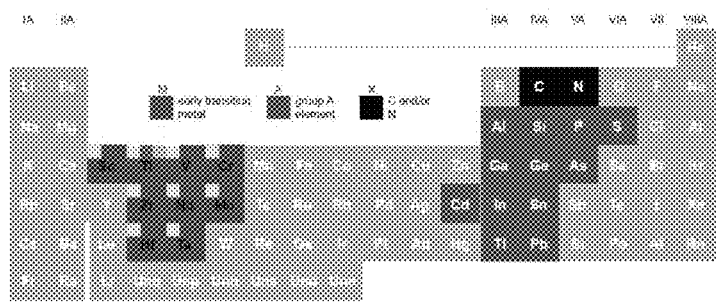
FIG. 2 is a diagram illustrating a composition of an original material MAX for forming a group of MXenes applicable to an embodiment of the present invention.

FIG. 1 is a diagram schematically illustrating a method of forming a MXene applicable to an embodiment of the present invention. FIG. 2 is a diagram illustrating a composition of an original material MAX for forming a group of MXenes applicable to an embodiment of the present invention.

Referring to FIGS. 1 and 2, the group of MXenes may be a two-dimensional (2D) material obtained by removing an A-layer from a MAX material ($M_{n+1}AX_n$) by etching (here, n=1 to 3, M represents an early transition metal, e.g., A: Al, Si, P, S, Ga, Ge, As, Cd, In, Sn, Tl, or Pb, and X represents C or N. Both M and X may consist of two or more components.).

Figure 3A:
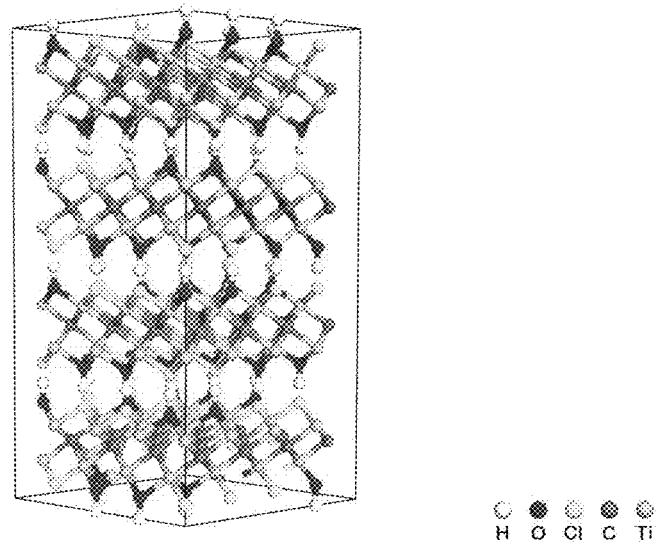
FIG. 3A is a diagram illustrating a structure of a side surface of a stacked MXene applicable to an embodiment of the present invention.
Figure 3B:
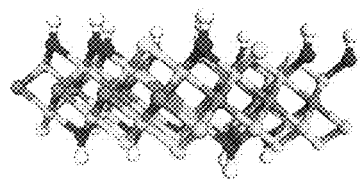
FIG. 3B is a diagram illustrating a side surface of a MXene having a single-layer structure applicable to an embodiment of the present invention.
Figure 3C:
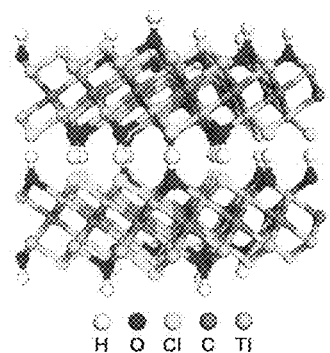
FIG. 3C is a diagram illustrating a side surface of a MXene having a two-layer structure applicable to an embodiment of the present invention.

FIG. 3A is a diagram illustrating a structure of a side surface of a stacked MXene applicable to an embodiment of the present invention. FIG. 3B is a diagram illustrating a side surface of a MXene having a single-layer structure applicable to an embodiment of the present invention. FIG. 3C is a diagram illustrating a side surface of a MXene having a two-layer structure applicable to an embodiment of the present invention.

FIG. 4A is a diagram illustrating a case in which there are only chemical groups between layers during stacking of a MXene (direct hydrogen bonds between layers). FIG. 4B is a diagram illustrating a case in which there are chemical groups and water molecules between layers during stacking of a MXene (indirect hydrogen bonds between layers).

Referring to FIGS. 3A to 3C, a MXene saturable absorber applicable to the present invention may have various structures having a bulk thickness, e.g., a stacked structure of FIG. 3A, a single-layer structure of FIG. 3B, or a two-layer structure of FIG. 3C.

In this case, generally, the MXene may have a surface having a surface functional group (generally, a mixture of all or some of —O, —OH and —F) other than a bare surface.

For example, referring to FIGS. 4A and 4B, a stacked structure including two or more layers has a form having terminal functional groups (e.g., a surface chemical group of each MXene layer) (see FIG. 4A) rather than a form having nothing between layers. In addition, water or intercalating ions may exist between the layers (see FIG. 4B). That is, only functional groups may exist between MXene layers, or a functional group, water, and ions may exist between multiple saturable absorber layers.

A transition metal of the MXene may include at least one material selected from the group consisting of Sc, Ti, V, Cr, Zr, Nb, Mo, Hf, and Ta or may include two or more types of metals.

X in the MXene may have a form having C or N or a mixture of C and N (which is referred to as a carbon nitride).

Figure 5A:
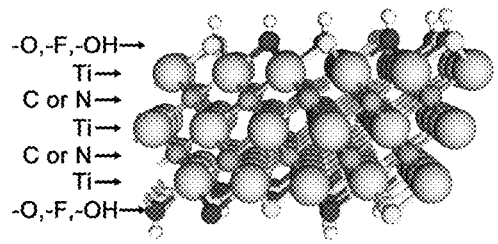
FIG. 5A is a diagram illustrating a structure of $Ti_3CN$ MXene.
Figure 5B:
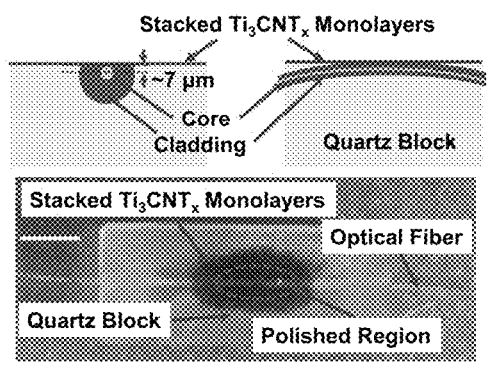
FIG. 5B a diagram and a photo showing a stacked $Ti_3CN$ film attached to a D-type (side-polished) optical fiber.
Figure 5C:
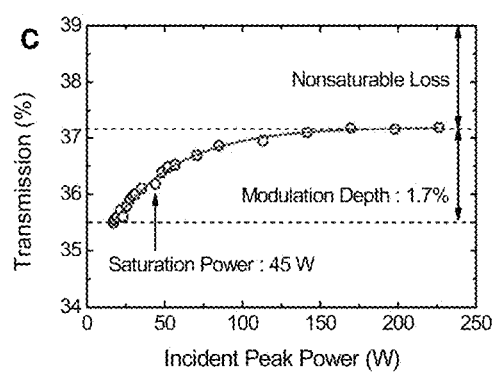
FIG. 5C is a transmission curve showing a non-linear saturable absorbing behavior of a device of FIG. 5B according to a change in the power of an incident laser beam.
Figure 6:
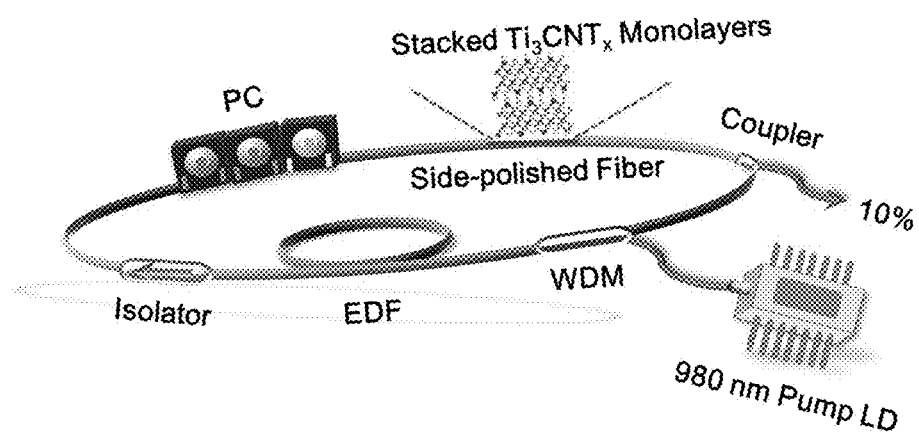
FIG. 6 is a diagram illustrating a mode-locked pulsed laser beam generating device using an MXene ($Ti_3CN$) saturable absorber according to an embodiment of the present invention.

FIG. 5A is a diagram illustrating a structure of $Ti_3CN$ MXene. FIG. 5B illustrates a diagram and a photo showing a stacked $Ti_3CN$ film attached to a D-type (side-polished) optical fiber. FIG. 5C is a transmission curve showing a non-linear saturable absorbing behavior of a device of FIG. 5B according to a change in the power of an incident laser beam. Specifically, FIG. 5C is a non-linear transmission graph showing a variation in the power of an incident laser beam with respect to a $Ti_3CN$ MXene saturable absorber according to an embodiment, and illustrates a saturable absorbing behavior of the above-described material. FIG. 6 is a diagram illustrating a mode-locked pulsed laser beam generating device using an MXene ($Ti_3CN$) saturable absorber according to an embodiment of the present invention. Here, PC, EDF, WDM, and LD respectively represent a polarization controller, an Er-doped fiber, wavelength division multiplexing, and a laser diode. The MXene saturable absorber may have various thicknesses, e.g., a single-layer thickness or a multi-layer thickness according to a laser system to which the absorber is applied, or may have a bulk thickness. As illustrated in FIG. 6, for evanescent coupling, a thin MXene film may be provided between ferrules to induce saturable absorption rather than attaching a saturable absorber to a side surface of a D-type optical fiber. Alternatively, the MXene saturable absorber may be used to generate a pulsed laser beam by Q-switching rather than mode locking. Generally, a Q-switching pulsed laser system does not need the polarization controller illustrated in FIG. 6 and may thus not include a polarization controller.

Referring to FIG. 6, a film formed of stacked $Ti_3CN$ MXene having a thickness of several tens of nanometers or micrometers according to an embodiment of the present invention may be manufactured by drop-casting, and may be used as a saturable-absorber material for a femtosecond optical fiber laser.

In an embodiment of the present invention, a thin film may be manufactured by mixing stacked $Ti_3C_2$ MXene having a thickness of several tens of nanometers or micrometers with polyvinyl alcohol (PVA), and may be used as a saturable-absorber material for a femtosecond optical fiber laser.

Figure 7A:
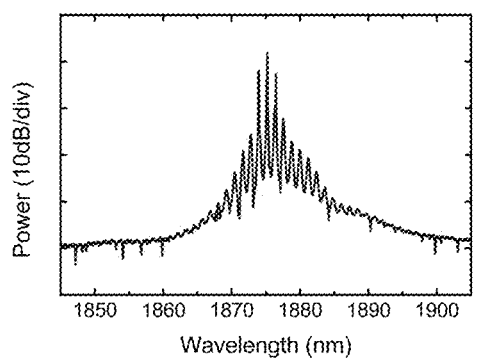
FIGS. 7A to 7D are diagrams illustrating a result of measuring a Q-switched pulsed laser beam obtained using a MXene ($Ti_3CN$) saturable absorber.
Figure 7B:
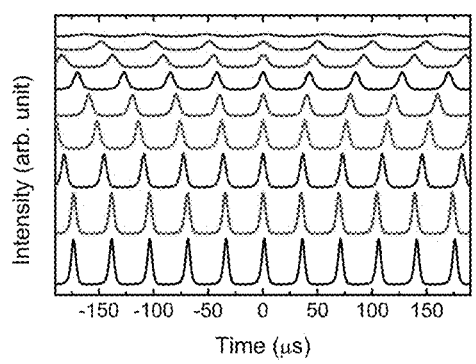
Figure 7C:
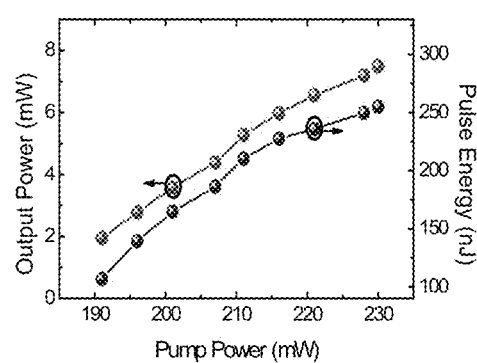
Figure 7D:
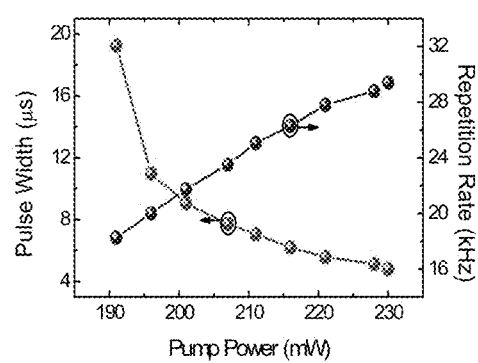

FIGS. 7A to 7D are diagrams illustrating a result of measuring a Q-switched pulsed laser beam obtained using an MXene ($Ti_3CN$) saturable absorber. FIG. 7A illustrates an optical spectrum (pump power: 230 mW). FIG. 7B illustrates oscilloscopic traces at a pump power of 194 (top) to 230 mW (bottom). FIG. 7C illustrates average output power and pulse energy. FIG. 7D illustrates a pulse width and a repetition rate plotted as a function of pump power in Q-switched optical fiber lasers using a $Ti_3$ saturable absorber ($Ti_3$CNTx SAs) and Tm—Ho-codoped optical fibers for the generation of 1875-nm laser pulses.

Figure 8A:
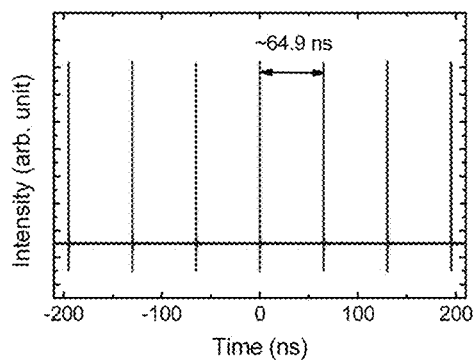
FIGS. 8A to 8D are diagrams illustrating a result of measuring a femtosecond mode-locked pulsed laser beam obtained using a MXene ($Ti_3CN$) saturable absorber.
Figure 8B:
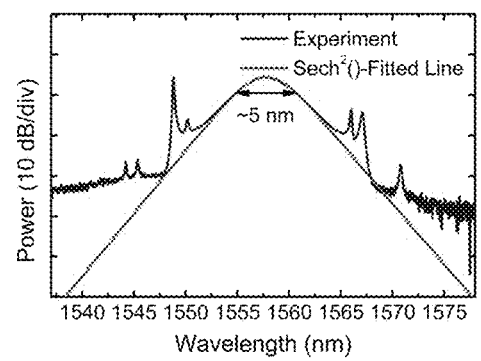
Figure 8C:
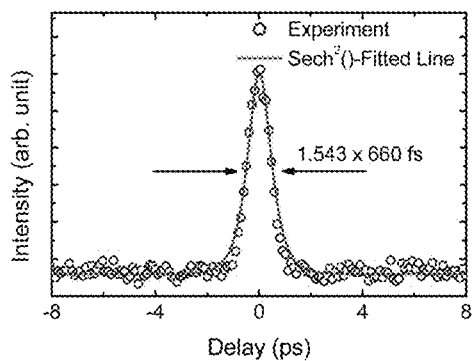
Figure 8D:
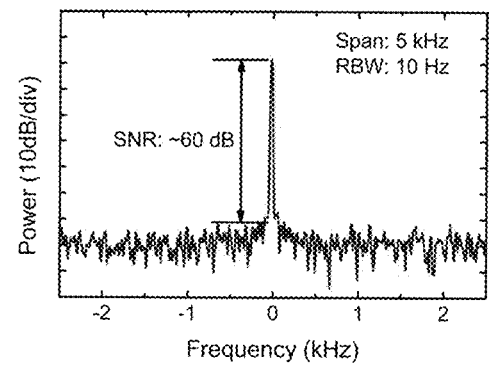

FIGS. 8A to 8D are diagrams illustrating a result of measuring a femtosecond mode-locked pulsed laser beam obtained using an MXene ($Ti_3CN$) saturable absorber. FIG. 8A illustrates an oscilloscope trace. FIG. 8B illustrates an optical spectrum. FIG. 8C illustrates an autocorrelation trace. FIG. 8D illustrates an electrical spectrum of output pulses.

Referring to FIGS. 8A to 8D, a result of measuring the performance of a mode-locked pulsed laser system using the $Ti_3CN$ MXene saturable absorber of FIG. 6 reveals that the system can achieve a very short pulse width which is in a femtosecond range and thus the performance thereof is very high (see article entitled "Metallic MXene Saturable Absorber for Femtosecond Mode-Locked Lasers", *Advanced Materials*, 2017).

In this case, $Ti_2C$, $Ti_3C_2$, $Ti_4C_3$, or the like may be used as the MXene, as well as $Ti_3CN$. The MXene may be used solely or in combination with a polymeric material.

In another embodiment, a MXene thin film formed of Mo, Cr, or Sc-based MXene may be manufactured and used as a saturable absorber of a laser system.

In another embodiment, MXene having a form in which not only a chemical functional group but also water and ions are inserted between MXene layers may be used as a saturable absorber of a laser system.

The laser mode-locking and Q-switching may be a laser mode-locking and Q-switching in a range of near-infrared, mid-infrared, or far-infrared.

According to the present invention, a new saturable absorber having improved chemical resistance and saturable absorption capability may be provided by using at least one material selected from a group of MXenes as a saturable absorber.

Furthermore, the MXene saturable absorber can be operated in a wider wavelength range than existing absorbers, and thus a pulsed laser system using the same is capable of generating a femtosecond pulsed laser beam through mode locking or Q-switching at lower costs.

The present invention is not limited to the above-described embodiments and the accompanying drawings and should be defined in the appended claims. Thus, it should be understood that various alternatives, modifications, and changes can be made in the technical idea of the present invention defined in the claims by those of ordinary skill in the art without departing from the technical idea of the invention, and fall within the scope of the invention.

What is claimed is:

1. A saturable absorber in combination with a laser system,
the saturable absorber comprising a stacked MXene having a bulk thickness of 1 nm or greater, and the stacked MXene comprises at least one of $Ti_2C$, $Ti_3C_2$, $Ti_4C_3$, or $Ti_3CN$, and
the laser system includes a pulsed laser beam.

2. The saturable absorber in combination with a laser system of claim 1, wherein the surface of the stacked MXene comprises at least one chemical functional group among —O, —OH, and —F.

3. The saturable absorber in combination with a laser system of claim 1, wherein only a functional group is included between layers of the stacked MXene.

4. The saturable absorber in combination with a laser system of claim 1, wherein a functional group, water, or ions are included between layers of the stacked MXene.

5. The saturable absorber in combination with a laser system of claim 1, wherein the MXene comprises $Ti_3CN$.

6. The saturable absorber in combination with a laser system of claim 1, wherein the saturable absorber is a compound which is a mixture of the stacked MXene and a polymer.

7. The saturable absorber in combination with a laser system of claim 1, wherein the laser system to generates a pulsed laser beam by mode locking.

8. The saturable absorber in combination with a laser system of claim 1, wherein the laser system generates a pulsed laser beam by Q-switching.

9. The saturable absorber in combination with a laser system of claim 1, wherein the laser system generates a pulsed laser beam with a wavelength ranging from near-infrared to far-infrared region.

10. The saturable absorber in combination with a laser system of claim 1, wherein the stacked MXene having a bulk thickness of several tens of nanometers to a micrometer.

11. The saturable absorber in combination with a laser system of claim 10, wherein the laser system generates a pulsed laser beam by mode locking or by Q-switching, the pulsed laser beam having a wavelength ranging from near-infrared to far-infrared region.

* * * * *